United States Patent
Peng

(10) Patent No.: US 12,298,816 B2
(45) Date of Patent: May 13, 2025

(54) METHOD FOR OBTAINING DATA INDICATING DIRECTION, ELECTRONIC DEVICE AND STORAGE MEDIUM

(71) Applicant: BEIJING XIAOMI MOBILE SOFTWARE CO., LTD., Beijing (CN)

(72) Inventor: Cong Peng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 552 days.

(21) Appl. No.: 17/576,820

(22) Filed: Jan. 14, 2022

(65) Prior Publication Data

US 2022/0308638 A1 Sep. 29, 2022

(30) Foreign Application Priority Data

Mar. 29, 2021 (CN) ......................... 202110334452.3

(51) Int. Cl.
*G06F 1/16* (2006.01)
(52) U.S. Cl.
CPC .......... *G06F 1/1677* (2013.01); *G06F 1/1618* (2013.01); *G06F 1/1641* (2013.01); *G06F 1/1656* (2013.01)
(58) Field of Classification Search
CPC .... G06F 1/1677; G06F 1/1618; G06F 1/1641; G06F 1/1656; G06F 1/1647; G06F 1/1652; G06F 1/1694; G06F 3/046; G06F 3/0346
See application file for complete search history.

(56) References Cited

U.S. PATENT DOCUMENTS

| 2013/0201093 | A1 | 8/2013 | Kim et al. |
| 2013/0265225 | A1 | 10/2013 | Nasiri et al. |
| 2014/0240264 | A1* | 8/2014 | Im .......................... G06F 1/1694 |
| | | | 345/173 |
| 2020/0340794 | A1* | 10/2020 | Park ......................... G01B 7/30 |

(Continued)

FOREIGN PATENT DOCUMENTS

| AU | 2013203011 A1 * | 10/2013 | ........... G06F 1/1652 |
| CN | 104075698 A | 10/2014 | |

(Continued)

OTHER PUBLICATIONS

Gomes et al."A Shape Changing Mobile Device with Multiple Reconfigurable Electrophoretic Magnetic Display Tiles" (Year: 2014).*

(Continued)

*Primary Examiner* — Eyob Hagos
(74) *Attorney, Agent, or Firm* — Arch & Lake LLP; Hao Tan; Shen Wang

(57) ABSTRACT

The present disclosure provides a method and apparatus for obtaining data indicating direction, electronic device and storage medium. This method, applied to an electronic device including a foldable screen with a magnetic sensor, includes: determining, in response to the foldable screen being in a non-folded state, an equivalent plane to which the magnetic sensor is equivalent; obtaining equivalent motion data by mapping detected motion data to the equivalent plane; and obtaining equivalent directional data by mapping directional data detected by the magnetic sensor to the equivalent plane. The equivalent motion data and the equivalent directional data indicate a motion direction of the electronic device.

20 Claims, 7 Drawing Sheets

(56) References Cited

U.S. PATENT DOCUMENTS

2021/0041912 A1* 2/2021 Eom ................. G06F 1/1677
2022/0413553 A1* 12/2022 Zhang ............... G06F 1/1686

FOREIGN PATENT DOCUMENTS

| CN | 104583905 | A | * | 4/2015 | ........... | G06F 1/1643 |
|----|-----------|---|---|--------|-------------|-------------|
| CN | 110307821 | A | * | 10/2019 | ........... | G06F 1/1643 |
| CN | 111256704 | A | | 6/2020 | | |
| CN | 111258375 | A | | 6/2020 | | |
| CN | 20200126317 | A | | 11/2020 | | |
| CN | 112099717 | A | | 12/2020 | | |
| JP | 2004165333 | A | * | 6/2004 | | |
| KR | 20200126317 | A | | 11/2020 | | |

OTHER PUBLICATIONS

Extended European Search Report of EP Application No. 22153181.7 dated Jul. 6, 2022, (15p).
CNOA issued in Application No. 202110334452.3 dated Dec. 21, 2024 with English translation, (14p).

* cited by examiner

```
┌─────────────────────────────────────────────────────┐
│ mapping motion data detected by the first acceleration sensor │
│ to the equivalent plane and mapping motion data detected by   │─── S123
│   the second acceleration sensor to the equivalent plane, and │
│          obtaining the equivalent motion data                 │
└─────────────────────────────────────────────────────┘
                           │
                           ▼
┌─────────────────────────────────────────────────────┐
│ mapping, in response to the magnetic sensor being provided    │
│  in the first sub-display directed within the visual range and│
│ the first sub-display being parallel to the equivalent plane, the │─── S124
│    motion data detected by the first acceleration sensor to the │
│    equivalent plane, and obtaining the equivalent motion data │
└─────────────────────────────────────────────────────┘
```

FIG. 10

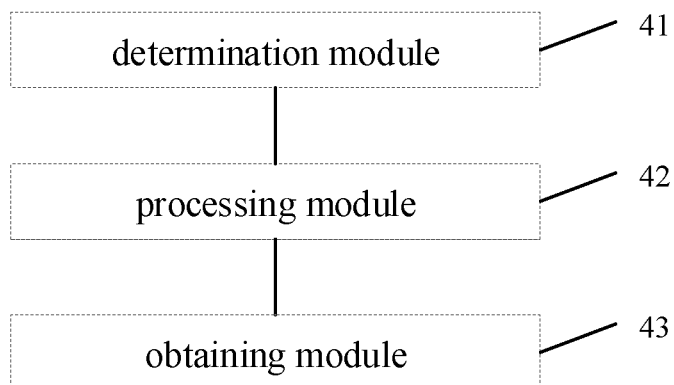

FIG. 11

METHOD FOR OBTAINING DATA INDICATING DIRECTION, ELECTRONIC DEVICE AND STORAGE MEDIUM

CROSS REFERENCE

This application is based upon and claims priority to Chinese Patent Application No. 202110334452.3, filed on Mar. 29, 2021, the entire content of which is incorporated herein by reference for all purposes.

TECHNICAL FIELD

The present disclosure relates to, but is not limited to, the field of communications technology, and in particular to a method and apparatus for obtaining data indicating direction, electronic device, and storage medium.

BACKGROUND

With the development of technology, the form of the display screens for electronic devices has also undergone great changes. Foldable screens are an emerging form for display in electronic devices. For example, when the foldable screen is folded, the electronic device can be displayed using the outer screen, and when the foldable screen is expanded, the electronic device can be displayed using the inner screen or the outer screen. For another example, foldable screens for electronic devices can be used in at least: a folded state, a half-folded state (or a half-expanded state) and an expanded state, depending on the degree of folding. Here, the half-folded state and expanded state can also be considered as non-folded state.

The use of electronic devices with foldable screens in different forms brings many changes to the use of the electronic devices' sensors (e.g., acceleration sensors or magnetic sensors). The output of the sensor data needs to be adjusted according to the different usage forms of the electronic devices with foldable screens. For example, the magnetic sensor of an electronic device with a foldable screen does not accurately indicate the direction of the electronic device when it is used in a non-folded state.

SUMMARY

The present disclosure provides a method and apparatus for obtaining data indicating direction, an electronic device, and a storage medium.

According to a first aspect of the present disclosure, there is provided a method for obtaining data indicating direction, applied to an electronic device. The electronic device includes a foldable screen with a magnetic sensor. The method for obtaining data indicating direction includes: determining, in response to the foldable screen being in a non-folded state, an equivalent plane to which the magnetic sensor is equivalent; mapping detected motion data to the equivalent plane, and obtaining equivalent motion data; and mapping directional data detected by the magnetic sensor to the equivalent plane, and obtaining equivalent directional data; where the equivalent motion data and the equivalent directional data indicate a motion direction of the electronic device.

According to a second aspect of the present disclosure, there is provided an electronic device, including: a foldable screen with a magnetic sensor; a processor; and a memory configured to store one or more executable instructions for the processor. The processor is configured to implement, when running the one or more executable instructions, the method for obtaining data indicating direction described in the first aspect of the present disclosure.

According to a third aspect of the present disclosure, there is provided a non-transitory computer readable storage medium storing an executable program. The executable program implements, when executed by a processor, the method for obtaining data indicating direction described in the first aspect of the present disclosure.

It should be understood that the above general description and the following detailed description are exemplary and explanatory only and cannot limit the present disclosure.

BRIEF DESCRIPTION OF THE DRAWINGS

The accompanying drawings herein are incorporated into and form part of this description, illustrate embodiments consistent with this disclosure, and are used with the description to explain the principles of this disclosure.

FIG. 10 illustrates a flowchart of a method for obtaining data indicating direction according to one or more examples of the present disclosure.

FIG. 11 illustrates a block diagram of a method for obtaining data indicating direction according to one or more examples of the present disclosure.

DETAILED DESCRIPTION

Figure 1:
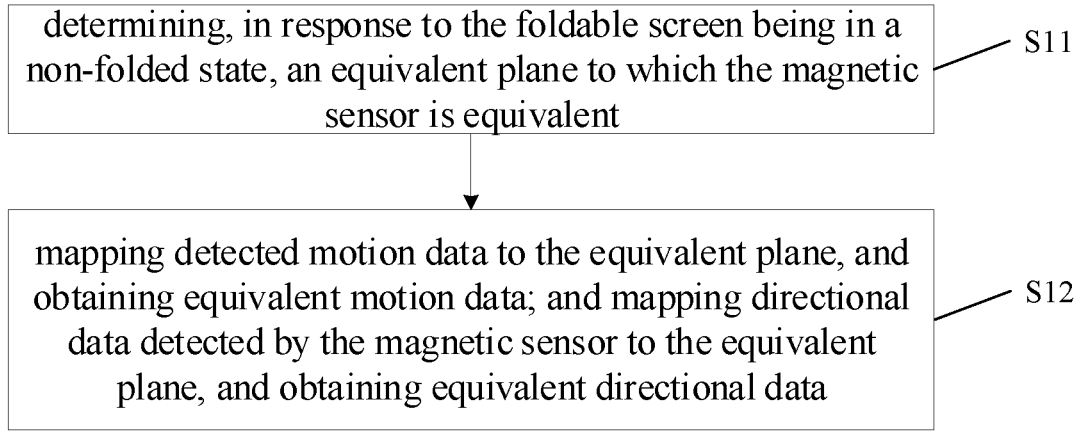
FIG. 1 illustrates a flowchart of a method for obtaining data indicating direction according to one or more examples of the present disclosure.

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 illustrates a flowchart of a method for obtaining data indicating direction provided in examples of the present disclosure. As shown in FIG. 1, the method for obtaining data indicating direction is applied to an electronic device including a foldable screen with a magnetic sensor, and the method includes the following steps.

At S11, determining, in response to the foldable screen being in a non-folded state, an equivalent plane to which the magnetic sensor is equivalent.

At S12, mapping detected motion data to the equivalent plane, and obtaining equivalent motion data; and mapping directional data detected by the magnetic sensor to the equivalent plane, and obtaining equivalent directional data.

The equivalent motion data and the equivalent directional data are used for indicating a motion direction of the electronic device.

The method for obtaining data indicating direction, described in examples of the present disclosure, is applied to an electronic device, and the electronic device includes a foldable screen. The electronic device herein is a mobile terminal or fixed terminal of any kind. For example, the electronic device may be, but is not limited to, a mobile phone, a computer, a tablet, or a television, and the like.

Here, the foldable screen includes at least two sub-displays.

In some examples, the foldable screen includes a first sub-display and a second sub-display.

Figure 2:
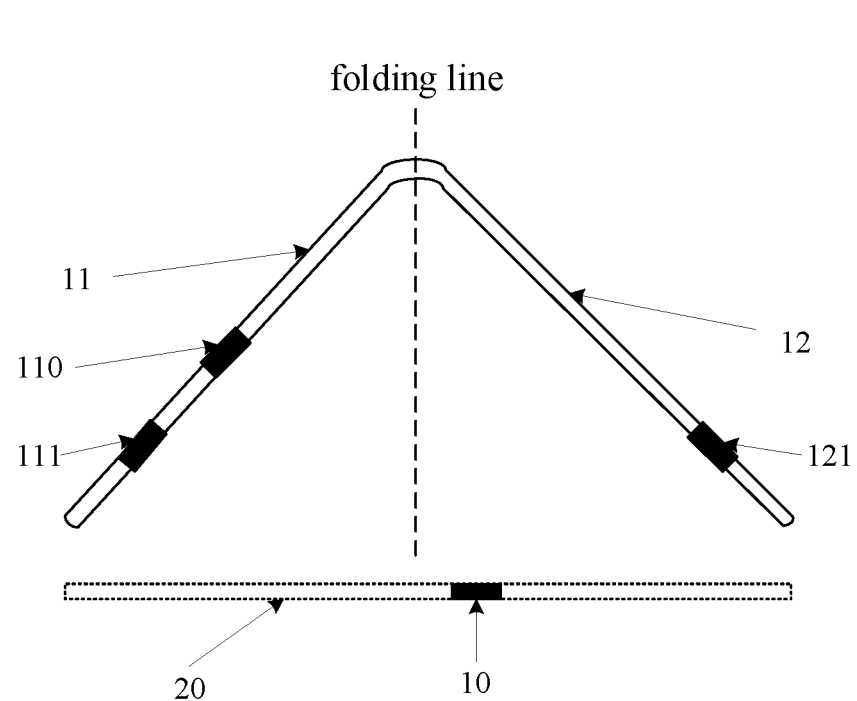
FIG. 2 illustrates a schematic diagram of a foldable screen according to one or more examples of the present disclosure.

In some examples, the first sub-display includes the magnetic sensor; alternatively, the second sub-display includes the magnetic sensor. For example, as shown in FIG. 2, there is a magnetic sensor 110 built into the first sub-display 11. In some examples, the magnetic sensor may be considered a compass.

Of course, in other examples, the magnetic sensor may be replaced with magnetic components that are capable of detecting the directional data used for indicating the direction of the electronic device, without limitation herein.

In some examples, the magnetic sensor is a three-axis magnetic sensor. The three axes of the three-axis magnetic sensor may include an X-axis, a Y-axis and a Z-axis. The X and Y axes here are two components indicating a plane parallel to the horizontal plane, the X and Y axes are perpendicular to each other and the Z axis is used for indicating a component perpendicular to the horizontal plane. Of course, in other examples, the magnetic sensor may be any other type of magnetic sensor or magnetic component, without limitation herein.

In some examples, the foldable screen includes one or more acceleration sensors.

S12 includes: mapping motion data detected by the one or more acceleration sensors to the equivalent plane, and obtaining the equivalent motion data; and mapping directional data detected by the magnetic sensor to the equivalent plane, and obtaining the equivalent directional data.

The equivalent motion data, together with the equivalent directional data, is used for indicating the motion direction of the electronic device by the magnetic sensor which is equivalent to the equivalent plane.

In this way, in examples of the present disclosure, the acceleration sensor(s) and the magnetic sensor of the electronic device can be equivalent to the same plane, such that the acceleration sensor(s) can compensate for tilt angle of the magnetic sensor to achieve accurate positioning of the electronic device even if the foldable screen of the electronic device is in a non-folded state.

In some examples, the one or more acceleration sensors include a first acceleration sensor and a second acceleration sensor, and the first acceleration sensor is provided in the first sub-display and the second acceleration sensor is provided in the second sub-display. For example, as shown in FIG. 2, a first acceleration sensor 111 is built into the first sub-display 11, and a second acceleration sensor 121 is built into the second sub-display 12.

Of course, in other examples, the acceleration sensor may be replaced with motion detection components that are capable of detecting the motion data used for indicating the velocity and acceleration of the electronic device, without limitation herein.

In some examples, the acceleration sensor is a three-axis acceleration sensor. The three axes of the three-axis acceleration sensor may include an X-axis, a Y-axis and a Z-axis. The X and Y axes here are two components indicating a plane parallel to the horizontal plane, the X and Y axes are perpendicular to each other and the Z axis is used for indicating a component perpendicular to the horizontal plane. Of course, in other examples, the acceleration sensor may be any other type of acceleration sensor or motion detection component, without limitation herein.

In some examples, the first acceleration sensor and the second acceleration sensor may be provided symmetrically based on a folding line of the foldable screen. Of course, in other examples, the first acceleration sensor and the second acceleration sensor may also be provided symmetrically without being based on the folding line of the foldable screen.

The foldable screen herein may be in a folded state or a non-folded state. The non-folded state includes a half-expanded state and an expanded state. For example, in some examples, when the foldable screen is in the folded state, an angle between the first sub-display and the second sub-display is 0 degrees; when the foldable screen is in the half-expanded state, the angle between the first sub-display and the second sub-display is greater than 0 degrees and less than 180 degrees; and when the foldable screen is in the expanded state, the angle between the first sub-display and the second sub-display is 180 degrees. The half-expanded state herein may also be considered as a half-folded state.

Figure 3:
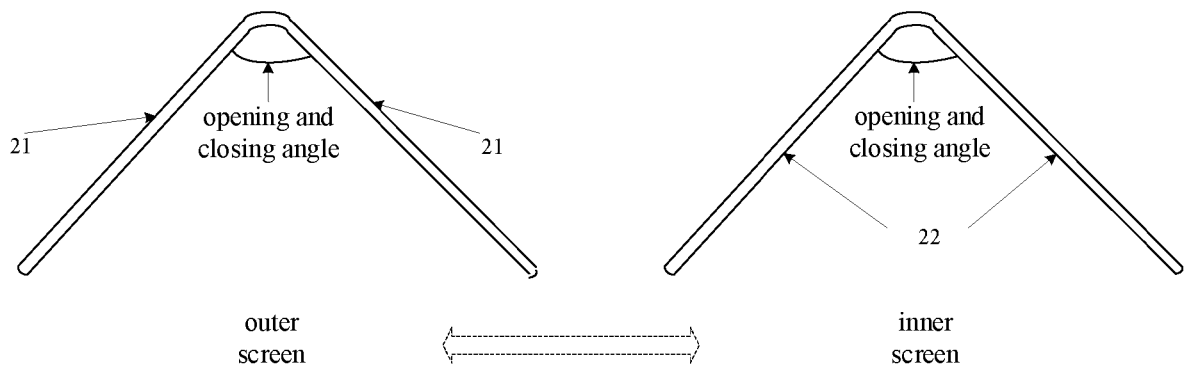
FIG. 3 illustrates a schematic diagram of a foldable screen according to one or more examples of the present disclosure.

In some examples, the non-folded state of the foldable screen may include: an expanded state, a half-folded state where the foldable screen is folded outwardly, or a half-folded state where the foldable screen is folded inwardly. For example, as shown in FIG. 3, when the foldable screen is in a half-folded state folded outwardly, content may be displayed on an outer screen 21 of the foldable screen, and when the foldable screen is in a half-folded state folded inwardly, content may be displayed on an inner screen 22 of the foldable screen.

In some examples, the non-folded state of the foldable screen may include: a non-folded state with the foldable screen being in landscape orientation, or a non-folded state with the foldable screen being in portrait orientation.

The motion data detected by the acceleration sensors herein, which may include motion data detected by the first sensor at the first sub-display and/or motion data detected by the second sensor at the second sub-display. The motion data includes data on the velocity and/or acceleration of the motion of the foldable screen.

The directional data detected by the magnetic sensor herein, which may include: directional data detected by the magnetic sensor at the first sub-display, or directional data detected by the magnetic sensor at the second sub-display.

In some examples, the equivalent plane includes, but not limited to, at least one of: a plane perpendicular to the horizontal plane, and a plane parallel to the horizontal plane.

In some examples, the determining the equivalent plane to which the magnetic sensor is equivalent, includes:
  determining the plane perpendicular to the horizontal plane as the equivalent plane to which the magnetic sensor is equivalent; or
  determining the plane parallel to the horizontal plane as the equivalent plane to which the magnetic sensor is equivalent.

In some examples, if the foldable screen is in the non-folded state, the plane parallel to the horizontal plane is set by default to be the equivalent plane. In another example, if the foldable screen is in the non-folded state, the plane perpendicular to the horizontal plane is set by default to be the equivalent plane.

Referring again to FIG. 2, when the magnetic sensor is equivalent to the equivalent plane, the equivalent magnetic sensor may be at any position in the equivalent plane; for example, it may be at position 10 of the equivalent plane.

In this way, in this example, the magnetic sensor can be equivalent to a horizontal plane or a plane perpendicular to the horizontal plane. Thus, the equivalent magnetic sensor on the horizontal plane or the plane perpendicular to the horizontal plane can be considered as not tilted or tilted by 90 degrees, thereby enabling the equivalent magnetic sensor to achieve more accurate direction indication.

Of course, in other examples, the equivalent plane may also be any of the planes. In this way, in this example, accurate indication of the direction of the electronic device is achieved by simply allowing the data detected by the acceleration sensor to correspond to the same plane as the data detected by the magnetic sensor, so that the acceleration sensor can compensate for the tilt angle of the magnetic sensor as well.

In some examples, the direction of motion of the electronic device includes: the direction of motion of the electronic device when it is stationary or the direction of motion of the electronic device when it is moving. For example, the electronic device is statically placed on a table, such as being in a direction due north. Another example is when the electronic device is moving forward, such as in a direction 30 degrees southeast, or in a direction in which the electronic device is moving backward, to the left or right, or to the right.

In the examples of the present disclosure, equivalent plane to which the magnetic sensor is equivalent may be determined in response to the foldable screen of the electronic device being in the non-folded state; the equivalent motion data is obtained by mapping the detected motion data to the equivalent plane; and the equivalent directional data is obtained by mapping the directional data detected by the magnetic sensor to the equivalent plane. The equivalent motion data and the equivalent directional data are used for indicating the motion direction of the electronic device. In this way, with the method described in the example of the present disclosure, the electronic device with the foldable screen in the non-folded state can make the detected motion data and the directional data detected by the magnetic sensor both equivalent to the equivalent plane to which the magnetic sensor needs to be equivalent, so that the equivalent motion data after equivalence can compensate for the tilt of the acceleration sensor. Thus, the magnetic sensor can accurately determine the motion direction of the electronic device, even when the foldable screen is unfolded at a certain angle.

Figure 4:
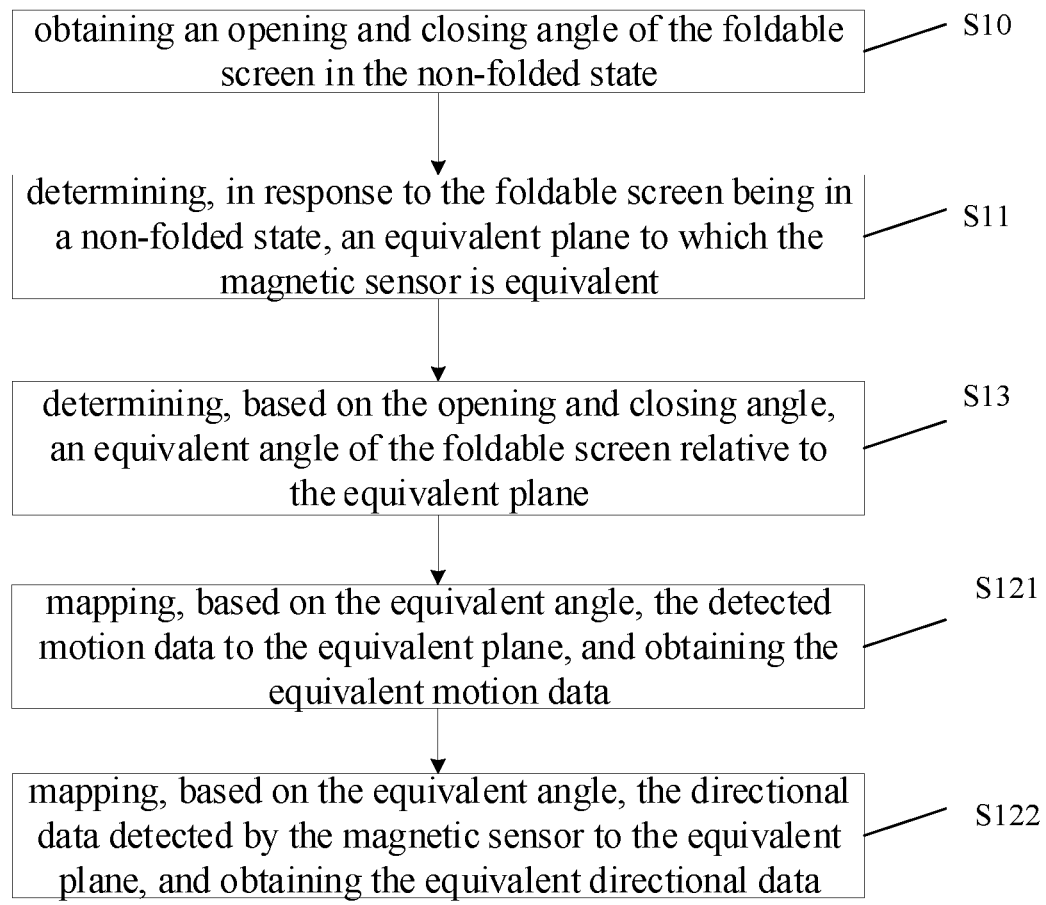
FIG. 4 illustrates a flowchart of a method for obtaining data indicating direction according to one or more examples of the present disclosure.

As shown in FIG. 4, in some examples, the method for obtaining data indicating direction further includes the following steps.

At S10, obtaining an opening and closing angle of the foldable screen in the non-folded state.

At S13, determining, based on the opening and closing angle, an equivalent angle of the foldable screen relative to the equivalent plane.

S12 includes the following steps.

At S121, mapping, based on the equivalent angle, the detected motion data to the equivalent plane, and obtaining the equivalent motion data.

At S122, mapping, based on the equivalent angle, the directional data detected by the magnetic sensor to the equivalent plane, and obtaining the equivalent directional data.

The foldable screen herein includes a first sub-display and a second sub-display, the first sub-display includes a first acceleration sensor and the second sub-display includes a second acceleration sensor.

The opening and closing angle of the foldable screen in the non-folded state here is the angle between the first sub-display and the second sub-display.

In some examples, S121 includes mapping, based on the equivalent angle, the motion data detected by the acceleration sensor to the equivalent plane, and obtaining the equivalent motion data.

A manner of achieving S121 is to convert the motion data detected by the acceleration sensor in a first coordinate system to a second coordinate system differing by an equivalent angle from the first coordinate system to obtain the equivalent motion data in the second coordinate system.

In some examples, if the detected motion data is data with components on the X, Y and Z axes, which are $V_{X1}$, $V_{y1}$, and $V_{Z1}$ respectively, the foldable screen is a vertical screen in the non-folded state at the equivalent angle C, then the equivalent motion data has components on the X, Y and Z axes, which are $V_{X2}=\cos C \times V_{X1}$, $V_{y2}=\sin C \times V_{y1}$, $V_{Z2}=V_{Z1}$ respectively, and the equivalent motion data relative to the equivalent plane are obtained based on $V_{X2}$, $V_{y2}$, and $V_{Z2}$.

A manner of achieving S122 is to convert the directional data detected by the magnetic sensor in a first coordinate system to a second coordinate system differing by an equivalent angle from the first coordinate system to obtain the equivalent directional data in the second coordinate system.

In some examples, if the directional data detected by the acceleration sensor is data with components on the X, Y and Z axes, which are $L_{X1}$, $L_{y1}$, and $L_{Z1}$ respectively, the foldable screen is a vertical screen in the non-folded state at the equivalent angle C, then the equivalent motion data has components on the X, Y and Z axes, which are $L_{X2}=\cos C \times L_{X1}$, $L_{y2}=\sin C \times L_{y1}$, $L_{Z2}=L_{Z1}$, and the equivalent motion data relative to the equivalent plane are obtained based on $L_{X2}$, $L_{y2}$, and $L_{Z2}$.

Of course, in other examples, there may be any of the other achievable equivalent manners, as long as the equivalence for the motion data and directional data is realized based on the same principle, which is not limited herein.

In some examples, S13 may include: determining the equivalent angle based on the opening and closing angle and the equivalent plane. Here, the equivalent angle is an angle between the sub-display provided with the magnetic sensor and the equivalent plane.

In some examples, S13 includes at least one of the following steps:
obtaining, based on the first acceleration sensor, a first angle between the first sub-display and a horizontal plane;
obtaining, based on the second acceleration sensor, a second angle between the second sub-display and the horizontal plane;
obtaining, based on the first angle and the second angle, the opening and closing angle of the foldable screen.

In some examples, obtaining the opening and closing angle of the foldable screen based on the first angle and the second angle, includes: obtaining the opening and closing angle of the foldable screen based on a sum of the first angle and the second angle.

In another example, obtaining the opening and closing angle of the foldable screen based on the first angle and the second angle, includes: obtaining the opening and closing angle of the foldable screen based on a difference between the first angle and the second angle.

In some examples, determining the equivalent angle based on the opening and closing angle, includes, but is limited to, at least one of the following:
determining the equivalent angle based on the opening and closing angle;
determining, based on the first angle of the opening and closing angle, the equivalent angle in response to the magnetic sensor being in the first sub-display;
determining, based on the second angle of the opening and closing angle, the equivalent angle in response to the magnetic sensor being in the second sub-display.

In the examples of the present disclosure, the opening and closing angle of the foldable screen can be obtained based on the non-foldable state held by the foldable screen, and based on the opening and closing angle, the equivalent angle of the magnetic sensor equivalent to the equivalent plane can be determined. In this way, accurate equivalence of motion data and directional data based on the equivalent angle can be achieved in the examples of the present disclosure, so that the equivalent directional data and equivalent motion data after equivalence can be used to determine the direction of the electronic device accurately.

Figure 5:
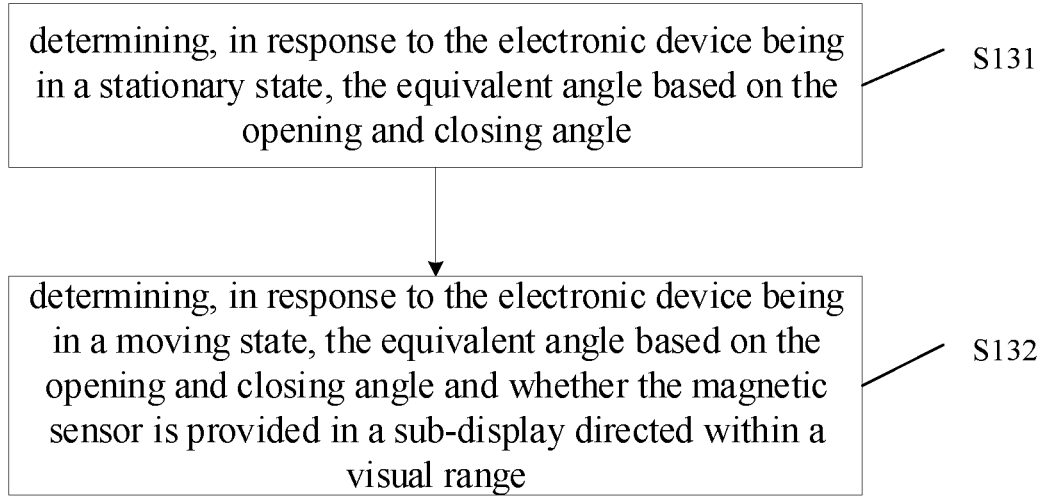
FIG. 5 illustrates a flowchart of a method for obtaining data indicating direction according to one or more examples of the present disclosure.

As shown in FIG. 5, in some examples, S13 includes at least one of the following steps.

At S131, determining, in response to the electronic device being in a stationary state, the equivalent angle based on the opening and closing angle.

At S132, determining, in response to the electronic device being in a moving state, the equivalent angle based on the opening and closing angle and whether the magnetic sensor is provided in a sub-display directed within a visual range.

In some examples, the magnetic sensor is provided in the first sub-display.

S131 includes: determining, in response to the electronic device being in the stationary state, the equivalent angle based on a difference between the first angle of the opening and closing angle and 90 degrees.

Figure 6:
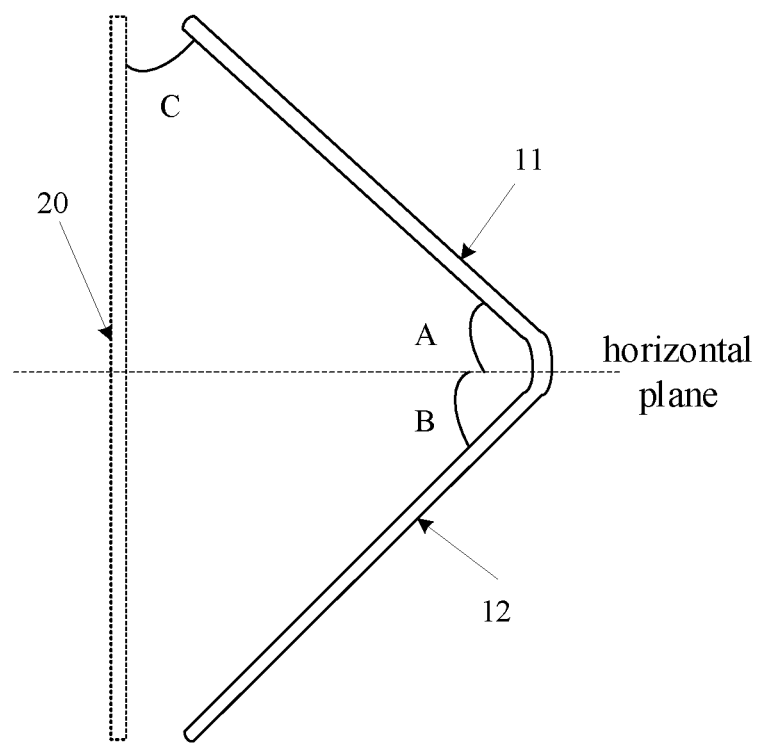
FIG. 6 illustrates a schematic diagram of a foldable screen according to one or more examples of the present disclosure.

In some examples, as shown in FIG. 6, assuming that the electronic device is in the stationary state, the first angle between the first sub-display 11 and the horizontal plane is denoted as A, the second angle between the second sub-display 12 and the horizontal plane is denoted as B, and the equivalent plane 20 is a plane perpendicular to the horizontal plane, the equivalent angle C can be determined based on the first angle A of the opening and closing angle, i.e., $C=90°-A$. In FIG. 6, the opening and closing angle is the sum of the first angle and the second angle.

In the above example, if the magnetic sensor is provided in the second sub-display, then the equivalent angle $C=90°-B$.

In the examples of the present disclosure, if the electronic device is in the stationary state, it is not possible to determine the sub-display viewed by the user. The equivalent angle can be determined directly based on the display where the magnetic sensor is provided and the equivalent plane. For example, if the magnetic sensor is provided in the first sub-display, the equivalent angle is determined based on the difference between the first angle of the opening and closing angle and 90 degrees. In this way, the equivalent angle can be accurately determined so as to achieve accurate indication of the direction of the electronic device when the electronic device is in the stationary sate and the foldable screen is unfolded at a certain angle.

In some examples, S132 includes one of the following steps:
determining, in response to the electronic device being in the moving state and the magnetic sensor being provided in the first sub-display directed within the visual range, the equivalent angle based on the difference between the first angle of the opening and closing angle and 90 degrees;
determining, in response to the electronic device being in the moving state, and the magnetic sensor being provided in the second sub-display instead of being provided in the first sub-display directed within the visual range, the equivalent angle based on the opening and closing angle.

The sub-display directed within the visual range herein is the sub-display viewed by the user. For example, the first sub-display directed within the visual range is the first sub-display which is viewed by the user.

In some examples, the electronic device may include an image detection device. In some examples, the electronic device detects image information using the image detection device, and determines, based on the image information, whether the sub-display directed within the visual range is a first sub-display or a second sub-display. In this way, in examples of the present disclosure, the sub-display viewed by the user can be determined from the images captured by the electronic device, i.e., the sub-display directed within the visual range can be determined.

In some examples, the first sub-display directed within the visual range includes the magnetic sensor, and determining the equivalent angle based on the difference between the first angle of the opening and closing angle and 90 degrees, includes one of the following steps:

determining that the equivalent angle is 0 degrees in response to the magnetic sensor being provided in the first sub-display directed within the visual range and the first sub-display being parallel to the equivalent plane;

determining that the equivalent angle is the difference between the first angle and 90 degrees in response to the magnetic sensor being provided in the first sub-display directed within the visual range and the first sub-display being not parallel to the equivalent plane.

Figure 7:
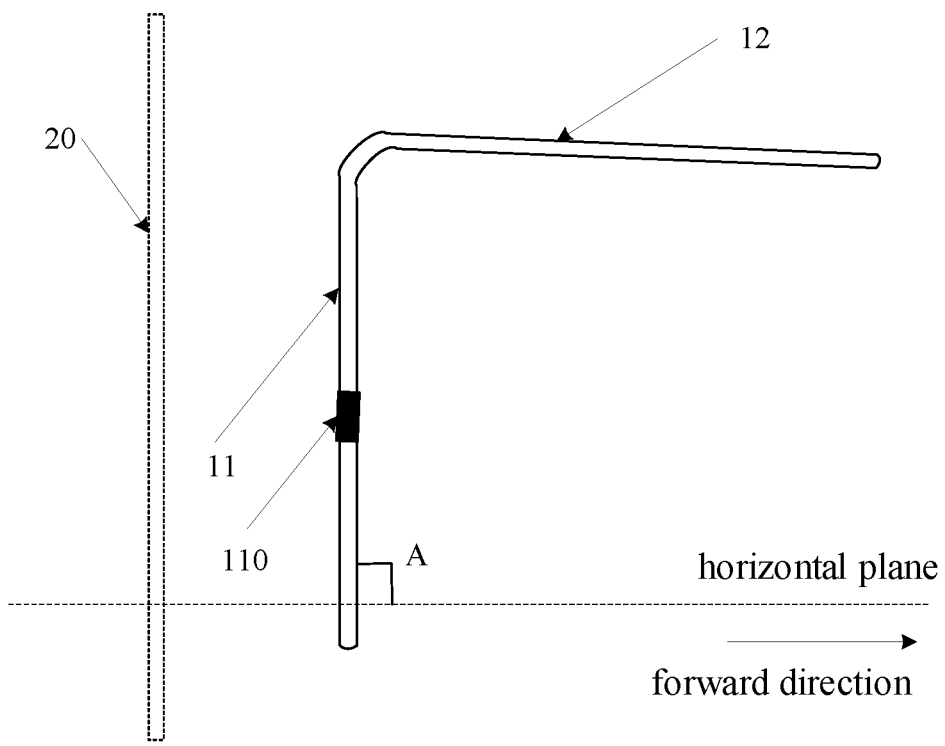
FIG. 7 illustrates a schematic diagram of a foldable screen according to one or more examples of the present disclosure.

In some examples, as shown in FIG. 7, the electronic device is in the moving state. If the user is viewing the first sub-display 11, the magnetic sensor 110 is provided in the first sub-display 11, and the first sub-display 11 is parallel to the equivalent plane 20 perpendicular to the horizontal plane, then the first sub-display 11 is also perpendicular to the horizontal plane (i.e. the first angle is 90 degrees), and the equivalent angle is determined as 0 degrees (i.e. the difference between the first angle and 90 degrees).

In this way, in the examples of the present disclosure, in response to the sub-display directed within the visual range (i.e. the sub-display viewed by the user) being the first sub-display and the first sub-display including a magnetic sensor, and the first sub-display being parallel to the equivalent plane, the direction of view of the user towards to the first sub-display can be determined to be horizontal, i.e. the direction of motion of the electronic device. In this way, it can be determined that the equivalent angle of the magnetic sensor is 0 degrees, i.e. the motion data collected by the first acceleration sensor and the directional data collected by the magnetic sensor themselves correspond to the equivalent plane, then no equivalence is necessary to achieve accurate indication of the direction of the electronic device' motion (i.e. the electronic device is moving).

Figure 8:
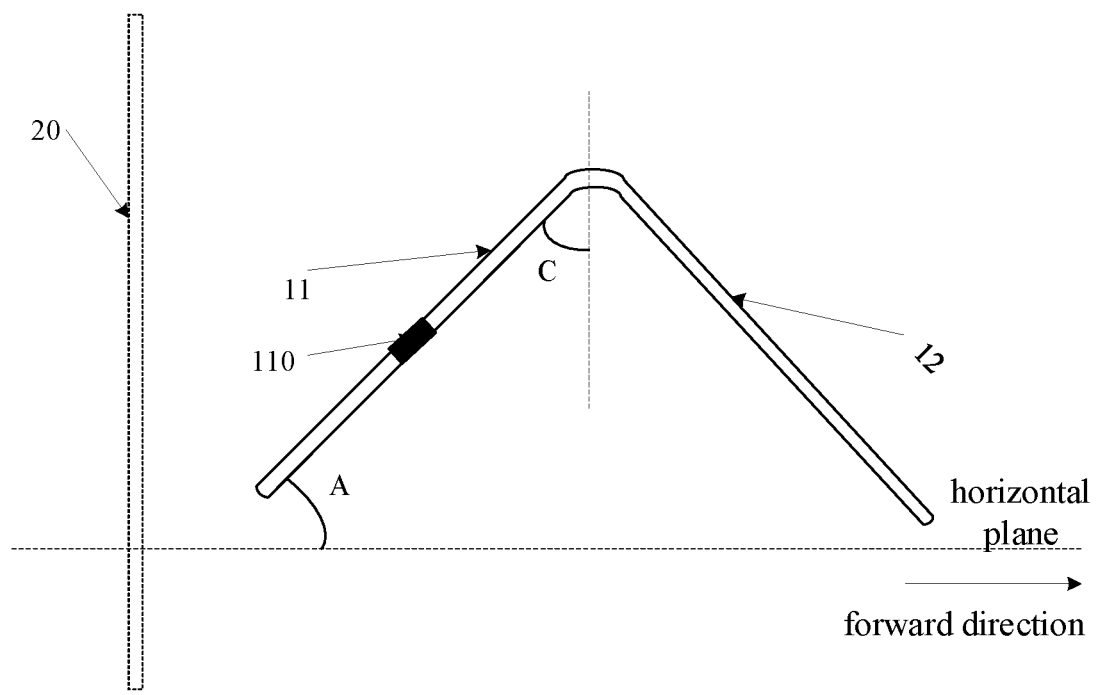
FIG. 8 illustrates a schematic diagram of a foldable screen according to one or more examples of the present disclosure.

In some examples, as shown in FIG. 8, the electronic device is in the moving state. If the user is viewing the first sub-display 11, the magnetic sensor 110 is provided in the first sub-display 11, the first sub-display 11 is not parallel to the equivalent plane 20, there is an angle between the first sub-display 11 and the horizontal plane denoted as a first angle A, and the equivalent plane 20 is perpendicular to the horizontal plane, then the equivalent angle C=90°−A.

In this way, in the examples of the present disclosure, in response to the sub-display directed within the visual range being the first sub-display, the first sub-display including the magnetic sensor, and the first sub-display being not parallel to the equivalent plane, it can be determined that the direction in which the user looks towards the first sub-display is not horizontal, i.e. the direction is not the direction of motion of the electronic device. In this way, it is necessary to determine the equivalent angle of the magnetic sensor which is the difference between the first angle and 90 degrees, so that the direction in which the user looks towards the first sub-display is equivalent to the horizontal direction to achieve accurate indication of the motion direction of the electronic device.

Figure 9:
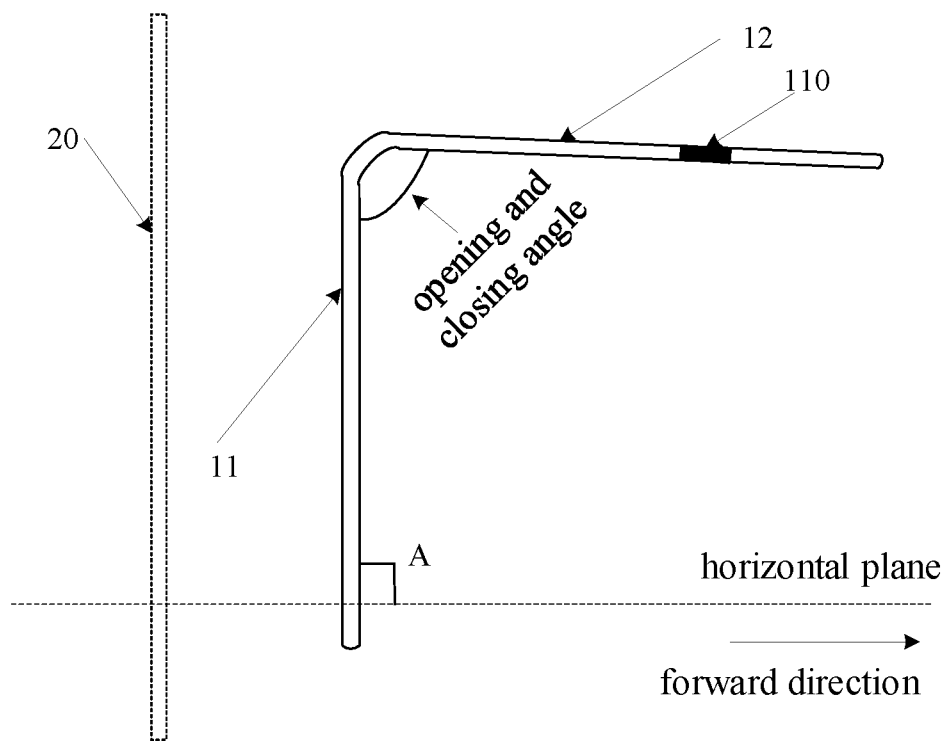
FIG. 9 illustrates a schematic diagram of a foldable screen according to one or more examples of the present disclosure.

In some examples, as shown in FIG. 9, the electronic device is in moving state. If the user is viewing the first sub-display 11 which is parallel to the equivalent plane 20, the equivalent plane 20 is perpendicular to the horizontal plane, the magnetic sensor 110 is not provided in the first sub-display 11 but in the second sub-display 12, then the magnetic sensor needs to be equivalent to the equivalent plane 20, and the equivalent angle C is the opening and closing angle. As shown in FIG. 9, the opening and closing angle is the difference between the first angle and the second angle.

In this way, in the examples of the present disclosure, in response to the magnetic sensor being not provided in the first sub-display directed within the visual range, and the first sub-display being parallel to the equivalent plane, the magnetic sensor provided in the second sub-display can be equivalent to the equivalent plane, so that the equivalent angle can be determined as the opening and closing angle, facilitating the equivalence of the motion data detected by the second acceleration sensor and the directional data detected by the magnetic sensor to the same plane, and thus realizing the accurate indication of the motion direction of the electronic device.

FIG. 7 or FIG. 8, or FIG. 9, exemplarily illustrates an application scenario where the outer screen is directed within the visual range. Of course, in other examples, it may also be an application scenario where the inner screen is directed within the visual range.

FIG. 7 or FIG. 8, or FIG. 9, exemplarily illustrates an application scenario where the horizontal screen is directed within the visual range. Of course, in other examples, it may also be an application scenario where the vertical screen is directed within the visual range.

In examples of the present disclosure, the equivalent angle can be determined when the electronic device is in a stationary state or a moving state; and the equivalent angle can also be determined when the electronic device is in a moving state and the sub-display directed within the visual range is provided with or without a magnetic sensor or the sub-display directed within the visual range is or is not parallel to the equivalent plane in the moving state, etc. Thus, the examples of the present disclosure provide a scheme for determining the equivalent angle in a variety of application scenarios, so that accurate indication of the motion direction of the electronic device in these application scenarios can be achieved.

As shown in FIG. 10, in some examples, mapping the detected motion data to the equivalent plane and obtaining the equivalent motion data at S12, includes one of the following steps.

At S123, mapping motion data detected by the first acceleration sensor to the equivalent plane and mapping motion data detected by the second acceleration sensor to the equivalent plane, and obtaining the equivalent motion data.

At S124, mapping, in response to the magnetic sensor being provided in the first sub-display directed within the visual range and the first sub-display being parallel to the equivalent plane, the motion data detected by the first acceleration sensor to the equivalent plane, and obtaining the equivalent motion data.

In any of the above examples, the equivalent motion data can be determined by the method at S123. In this way, the motion data detected by both acceleration sensors can be equivalent to the equivalent plane, thereby obtaining more accurate equivalent motion data, which in turn can further improve the accuracy of indicating the direction of the electronic device.

In the examples of the present disclosure, in response to the first sub-display directed within the visual range being provided with the magnetic sensor, and the first sub-display being parallel to the equivalent plane, the equivalent angle is determined as 0 degrees, and the direction in which the user views the electronic device is the same as the direction of motion of the electronic device. In this way, the motion data detected by the first acceleration sensor can represent the motion of the electronic device, so that only the motion data detected by the first acceleration sensor can be equivalent to the equivalent plane, which also realizes the accurate indication of the direction of motion of the electronic device.

FIG. 11 provides an example illustrating a direction indication apparatus, applied to an electronic device. The electronic device includes a foldable screen with a magnetic sensor, and the direction indication apparatus includes:

a determination module 41, configured to determine, in response to the foldable screen being in a non-folded state, an equivalent plane to which the magnetic sensor is equivalent; and a processing module 42, configured to obtain equivalent motion data by mapping motion data detected by the electronic device to the equivalent plane; and obtain equivalent directional data by mapping directional data detected by the magnetic sensor to the equivalent plane;

where the equivalent motion data and the equivalent directional data are used for indicating a motion direction of the electronic device.

In some examples, the apparatus further includes:

an obtaining module 43, configured to an opening and closing angle of the foldable screen in the non-folded state;

the determination module 41 is further configured to determine, based on the opening and closing angle, an equivalent angle of the foldable screen relative to the equivalent plane; and the processing module 42 is further configured to obtain the equivalent motion data by mapping the detected motion data to the equivalent plane based on the equivalent angle, and obtain the equivalent directional data by mapping the directional data detected by the magnetic sensor to the equivalent plane based on the equivalent angle.

In some examples, the foldable screen includes at least a first sub-display and a second sub-display, the first sub-display includes a first acceleration sensor and the second sub-display includes a second acceleration sensor; and the obtaining module 43 is further configured to perform at least one of following:

obtaining, based on the first acceleration sensor, a first angle between the first sub-display and a horizontal plane;

obtaining, based on the second acceleration sensor, a second angle between the second sub-display and the horizontal plane;

obtaining, based on the first angle and the second angle, the opening and closing angle of the foldable screen.

In some example, the determination module 41 is further configured to determine, in response to the electronic device being in a stationary state, the equivalent angle based on the opening and closing angle; or the determination module 41 is further configured to determine, in response to the electronic device being in a moving state, the equivalent angle based on the opening and closing angle and whether the magnetic sensor is provided in a sub-display directed within a visual range.

In some examples, the magnetic sensor is provided in the first sub-display; and the determination module 41 is further configured to determine, in response to the electronic device being in the stationary state, the equivalent angle based on a difference between the first angle of the opening and closing angle and 90 degrees.

In some examples, the determination module 41 is further configured to determine, in response to the electronic device being in the moving state and the magnetic sensor being provided in the first sub-display directed within the visual range, the equivalent angle based on the difference between the first angle of the opening and closing angle and 90 degrees; or the determination module 41 is further configured to determine, in response to the electronic device being in the moving state, and the magnetic sensor being provided in the second sub-display instead of being provided in the first sub-display directed within the visual range, the equivalent angle based on the opening and closing angle.

In some examples, the determination module 41 is further configured to determine that the equivalent angle is 0 degrees in response to the magnetic sensor being provided in the first sub-display directed within the visual range and the first sub-display being parallel to the equivalent plane.

In some examples, the processing module 42 is further configured to obtain the equivalent motion data by mapping motion data detected by the first acceleration sensor to the equivalent plane and mapping motion data detected by the second acceleration sensor to the equivalent plane; or the processing module 42 is further configured to obtain, in response to the magnetic sensor being provided in the first sub-display directed within the visual range and the first sub-display being parallel to the equivalent plane, the equivalent motion data by mapping the motion data detected by the first acceleration sensor to the equivalent plane.

In some example, the determination module 41 is further configured to determine a plane perpendicular to a horizontal plane as the equivalent plane to which the magnetic sensor is equivalent; or the determination module 41 is further configured to determine a plane parallel to a horizontal plane as the equivalent plane to which the magnetic sensor is equivalent.

With respect to the apparatus in the above-described examples, the specific manner in which the individual modules perform operations has been described in detail in the examples relating to the method for obtaining data indicating direction, and will not be described in detail here.

Examples of the present disclosure further provide an electronic device, which includes:

a processor; and a memory configured to store one or more executable instructions for the processor;

where the processor is configured to implement, when running the one or more executable instructions thereon, the method for obtaining data indicating direction described in any example of the present disclosure.

The memory may include various types of storage media that are non-transitory computer storage media capable of continuing to remember to store information thereon after the communication device has been powered down.

The processor may be connected to the memory via a bus or the like for reading an executable program stored on the memory, to implement at least one of the methods, for example, as shown in FIGS. 1, 4, 5 and 10.

Examples of the present disclosure further provide a computer readable storage medium. The computer readable storage medium stores an executable program that, when executed by a processor, implements the method for obtaining data indicating direction described in any example of the present disclosure, e.g., at least one of the methods as shown in FIGS. 1, 4, 5 and 10.

With respect to the apparatus described in the above examples, the specific manner in which the individual modules perform operations has been described in detail in the examples relating to the method for obtaining data indicating direction, and will not be described in detail here.

Figure 12:
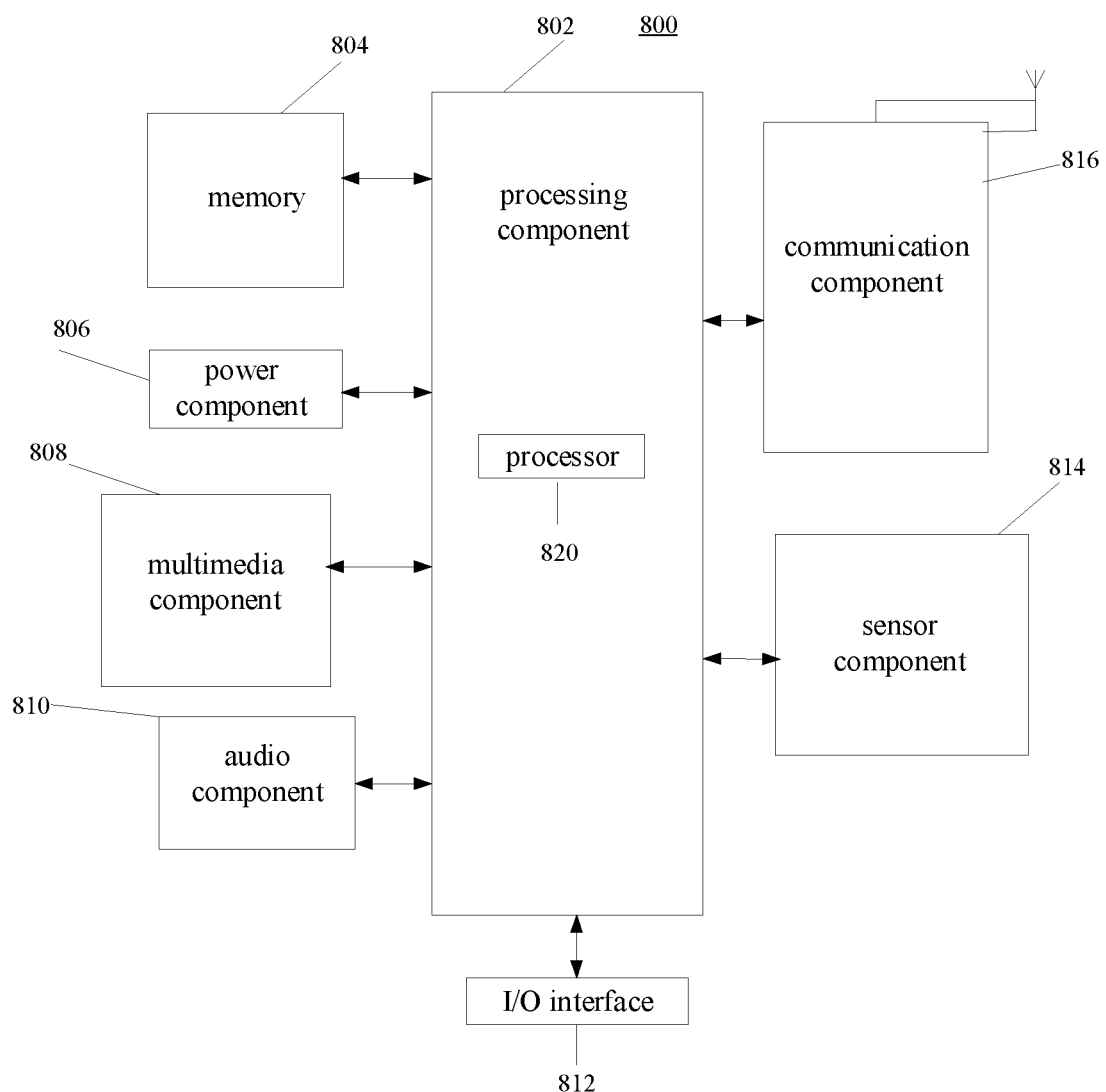
FIG. 12 illustrates a block diagram of an electronic device according to one or more examples of the present disclosure.

FIG. 12 illustrates a block diagram of an electronic device 800 according to some examples. For example, the electronic device 800 may be a mobile phone, a computer, a digital broadcast electronic device, a message sending and receiving device, a gaming console, a tablet device, a medical device, a fitness device, a personal digital assistant, and the like.

Referring to FIG. 12, the electronic device 800 may include one or more of the following components: processing component 802, memory 804, power component 806, multimedia component 808, audio component 810, and interface 812 for input/output (I/O), sensor component 814 and communication component 816.

The processing component 802 typically controls the overall operation of the electronic device 800, such as operations associated with display, telephone call, data communication camera operation, and recording operations. The processing component 802 may include one or more processors 820 to execute instructions to complete all or some of the steps of the method for obtaining data indicating direction described above. In addition, processing component 802 may include one or more modules that facilitate interaction between processing component 802 and other components. For example, processing component 802 may include a multimedia module to facilitate interaction between multimedia component 808 and processing component 802.

The memory 804 is configured to store various types of data to support operation at the device 800. Examples of such data include instructions for any application or method to operate on the electronic device 800, contact data, phonebook data, messages, pictures, videos, and the like. The memory 804 may be implemented by any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), and magnetic memory, flash memory Disk or CD-ROM.

The power component 806 provides power to various components of the electronic device 800. The power component 806 may include a power management system, one or more power supplies, and other components associated with generating, managing, and distributing power for the electronic device 800.

The multimedia component 808 includes a screen that provides an output interface between the electronic device 800 and a user. In some examples, the screen may include a liquid crystal display (LCD) and a touch panel (TP). If the screen includes a touch panel, the screen may be implemented as a touch screen to receive an input signal from a user. The touch panel includes one or more touch sensors to sense touches, swipes, and gestures on the touch panel. The touch sensors may not only sense the boundaries of the touch or swipe action, but also detect the duration and pressure associated with said touch or swipe action. In some examples, the multimedia component 808 includes a front-facing camera and/or a rear-facing camera. The front camera and/or rear camera may receive external multimedia data when the device 800 is in an operating mode, such as a shooting mode or a video mode. Each front camera and rear camera may be a fixed optical lens system or have a focal length and optical zoom capability.

The audio component 810 is configured to output and/or input an audio signal. For example, the audio component 810 includes a microphone (MIC) configured to receive external audio signals when the electronic device 800 is in an operating mode, such as a call mode, a recording mode, and a voice recognition mode. The received audio signal may be further stored in memory 804 or sent via communication component 816. In some examples, audio component 810 further includes a speaker for outputting an audio signal.

The I/O interface 812 provides an interface between the processing component 802 and a peripheral interface module. The peripheral interface module may be a keypad, click wheel button, etc. These buttons may include, but are not limited to, a home button, a volume button, a start button and a lock button.

The sensor component 814 includes one or more sensors for providing a status assessment of various aspects of the electronic device 800. For example, sensor component 814 may detect the open/closed state of device 800, relative positioning of components, such as the components being a display and keypad of electronic device 800, sensor component 814 may also detect a change in position of electronic device 800 or a component of electronic device 800, the presence or absence of user contact with electronic device 800, orientation or acceleration/deceleration of the electronic device 800 and a change in temperature of the electronic device 800. The sensor component 814 may include a proximity sensor configured to detect the presence of a nearby object in the absence of any physical contact. The sensor component 814 may also include a light sensor, such as a CMOS or CCD image sensor, for use in an imaging application. In some examples, the sensor component 814 may also include an acceleration sensor, a gyroscope sensor, a magnetic sensor, a pressure sensor, or a temperature sensor.

The communication component 816 is configured to facilitate communication between the electronic device 800 and other devices by wired or wireless means. The electronic device 800 may access a wireless network based on a communication standard, such as WiFi, 2G or 3G, or a combination thereof. In some examples, communication component 816 receives a broadcast signal or broadcast-related information from an external broadcast management system via a broadcast channel. In some examples, the communication component 816 further includes a near-field communication (NFC) module to facilitate short-range communication. For example, in the NFC module may be implemented based on radio frequency identification (RFID) technology, infrared data association (IrDA) technology, ultra-wideband (UWB) technology, Bluetooth (BT) technology, and other technologies.

In some examples, the electronic device 800 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for performing the methods described above.

In some examples, there is also provided a non-transitory computer readable storage medium including one or more instructions, such as a memory 804 including one or more instructions, the one or more instructions being executable by a processor 820 of the electronic device 800 to accomplish the method for obtaining data indicating direction described above. For example, the non-transitory computer readable storage medium may be ROM, random access memory (RAM), CD-ROM, magnetic tape, floppy disk, and optical data storage devices, among others.

Other examples of the disclosure will readily come to the mind of those skilled in the art upon consideration of the description and practice of the content disclosed herein. The present application is intended to cover any variations, uses or adaptations of the present disclosure which follow the general principles of the application and include commonly known or customary technical means in the art not disclosed herein. The description and examples are considered exemplary only, and the true scope and spirit of the invention is indicated by the following claims.

It should be understood that the present disclosure is not limited to the precise construction already described above and illustrated in the accompanying drawings, and that various modifications and changes may be made without departing from its scope. The scope of the present disclosure is limited only by the appended claims.

What is claimed is:

1. A method for obtaining data indicating direction, applied to an electronic device, wherein the electronic device comprises a foldable screen, a magnetic sensor, motion detection component, and a processor, the method comprising:
    detecting, by the motion detection components, first motion data;
    detecting, by the magnetic sensor, first directional data; and
    executing, by the processor, executable instructions to perform acts including:
    determining, in response to the foldable screen being in a non-folded state, a reference plane, wherein the reference plane is perpendicular or parallel to a horizontal plane, a third angle is between the reference plane and a sub-display where the magnetic sensor is located, and when the magnetic sensor is on the reference plane, and the reference plane is parallel to the horizontal plane, the magnetic sensor is not tilted, and when the magnetic sensor is on the reference plane, and the reference plane is perpendicular to the horizontal plane, the magnetic sensor is tilted by 90 degrees;
    converting the first motion data in a first coordinate system to second motion data in a second coordinate system differing by the third angle from the first coordinate system; and
    converting the first directional data in the first coordinate system to second directional data in the second coordinate system differing by the third angle from the first coordinate system;
    wherein the second motion data and the second directional data indicate a motion direction of the electronic device.

2. The method of claim 1, wherein the processor executes the instructions to perform acts including:
    obtaining an opening and closing angle of the foldable screen in the non-folded state; and
    determining, based on the opening and closing angle, the third angle between the reference plane and the sub-display where the magnetic sensor is located.

3. The method of claim 2, wherein the motion detection components comprises a first acceleration sensor and a second acceleration sensor, and the foldable screen comprises at least: a first sub-display and a second sub-display, the first sub-display comprising the first acceleration sensor, and the second sub-display comprising the second acceleration sensor; and
    wherein obtaining the opening and closing angle of the foldable screen in the non-folded state further comprises at least one of the following acts:
    obtaining, based on the first acceleration sensor, a first angle between the first sub-display and the horizontal plane;
    obtaining, based on the second acceleration sensor, a second angle between the second sub-display and the horizontal plane; or
    obtaining, based on the first angle and the second angle, the opening and closing angle of the foldable screen.

4. The method of claim 3, wherein determining, based on the opening and closing angle, the third angle between the reference plane and the sub-display where the magnetic sensor is located further comprises:
    determining, in response to the electronic device being in a stationary state, the third angle based on the opening and closing angle; and
    determining, in response to the electronic device being in a moving state, the third angle based on the opening and closing angle and whether the sub-display is directed within a visual range, wherein the sub-display directed within the visual range is viewed by a user.

5. The method of claim 4, wherein the magnetic sensor is provided in the first sub-display and the processor executes the instructions to perform acts including:
    determining, in response to the electronic device being in the stationary state, the third angle based on a difference between 90 degrees and the first angle of the opening and closing angle.

6. The method of claim 4, wherein the processor executes the instructions to perform acts including:
    determining, in response to the electronic device being in the moving state and the magnetic sensor being provided in the first sub-display directed within the visual range, the third angle based on the difference between 90 degrees and the first angle of the opening and closing angle; and
    determining, in response to the electronic device being in the moving state, and the magnetic sensor being provided in the second sub-display instead of being provided in the first sub-display directed within the visual range, the third angle based on the opening and closing angle.

7. The method of claim 6, wherein the processor executes the instructions to perform acts including:
    determining that the third angle is 0 degree in response to the magnetic sensor being provided in the first sub-display directed within the visual range and the first sub-display being parallel to the reference plane.

8. The method of claim 3, wherein converting the first motion data in the first coordinate system to the second motion data in the second coordinate system comprises one of the following acts:
    converting the first motion data detected by the first acceleration sensor in the first coordinate system to the second motion data in the second coordinate system, and converting the first motion data detected by the second acceleration sensor in the first coordinate system to the second motion data in the second coordinate system; or converting the first motion data detected by the first acceleration sensor in the first coordinate system to the second motion data in the second coordinate system.

9. The method of claim 3, wherein obtaining the opening and closing angle of the foldable screen based on the first angle and the second angle, comprises the following acts: obtaining the opening and closing angle of the foldable screen based on a sum of the first angle and the second angle.

10. The method of claim 3, wherein obtaining the opening and closing angle of the foldable screen based on the first angle and the second angle, comprises the following acts: obtaining the opening and closing angle of the foldable screen based on a difference between the first angle and the second angle.

11. An electronic device, comprising:
motion detection components configured to detect first motion data;
a foldable screen with a magnetic sensor configured to detect first directional data;
a processor; and
a memory configured to store one or more executable instructions for the processor; wherein the processor is configured, when running the one or more executable instructions, to determine, in response to the foldable screen being in a non-folded state, wherein the reference plane is perpendicular or parallel to a horizontal plane, a third angle is between the reference plane and a sub-display where the magnetic sensor is located, and when the magnetic sensor is on the reference plane, and the reference plane is parallel to the horizontal plane, the magnetic sensor is not tilted, and when the magnetic sensor is on the reference plane, and the reference plane is perpendicular to the horizontal plane, the magnetic sensor is tilted by 90 degrees;
convert the first motion data in a first coordinate system to second motion data in a second coordinate system differing by the third angle from the first coordinate system; and
convert the first directional data in the first coordinate system to second directional data in the second coordinate system differing by the third angle from the first coordinate system;
wherein the second motion data and the second directional data indicate a motion direction of the electronic device.

12. The electronic device of claim 11, wherein the processor is further configured to:
obtain an opening and closing angle of the foldable screen in the non-folded state; and
determine, based on the opening and closing angle, the third angle between the reference plane and the sub-display where the magnetic sensor is located.

13. The electronic device of claim 12, wherein the motion detection components comprises a first acceleration sensor and a second acceleration sensor, and the foldable screen comprises at least: a first sub-display and a second sub-display, the first sub-display comprising the first acceleration sensor and the second sub-display comprising the second acceleration sensor; and
wherein the processor is further configured to perform at least one of the following acts:
obtaining, based on the first acceleration sensor, a first angle between the first sub-display and the horizontal plane;

obtaining, based on the second acceleration sensor, a second angle between the second sub-display and the horizontal plane; or
obtaining, based on the first angle and the second angle, the opening and closing angle of the foldable screen.

14. The electronic device of claim 13, wherein the processor is configured to:
determine, in response to the electronic device being in a stationary state, the third angle based on the opening and closing angle; and
determine, in response to the electronic device being in a moving state, the third angle based on the opening and closing angle and whether the magnetic sensor is provided in a sub-display directed within a visual range, wherein the sub-display directed within the visual range is viewed by a user.

15. The electronic device of claim 14, wherein the magnetic sensor is provided in the first sub-display and the processor is further configured to:
determine, in response to the electronic device being in the stationary state, the third angle based on a difference between 90 degrees and the first angle of the opening and closing angle.

16. The electronic device of claim 14, wherein the processor is further configured to:
determine, in response to the electronic device being in the moving state and the magnetic sensor being provided in the first sub-display directed within the visual range, the third angle based on the difference between 90 degrees and the first angle of the opening and closing angle; and
determine, in response to the electronic device being in the moving state, and the magnetic sensor being provided in the second sub-display instead of being provided in the first sub-display directed within the visual range, the third angle based on the opening and closing angle.

17. The electronic device of claim 16, wherein the processor is further configured to:
determine that the third angle is 0 degree in response to the magnetic sensor being provided in the first sub-display directed within the visual range and the first sub-display being parallel to the reference plane.

18. The electronic device of claim 13, wherein the processor is further configured to:
convert the first motion data detected by the first acceleration sensor in the first coordinate system to the second motion data in the second coordinate system, and convert the first motion data detected by the second acceleration sensor in the first coordinate system to the second motion data in the second coordinate system;
convert the first motion data detected by the first acceleration sensor in the first coordinate system to the second motion data in the second coordinate system.

19. The electronic device of claim 13, wherein the processor is configured to perform one of the following acts:
obtaining the opening and closing angle of the foldable screen based on a sum of the first angle and the second angle; or
obtaining the opening and closing angle of the foldable screen based on a difference between the first angle and the second angle.

20. A non-transitory computer readable storage medium storing an executable program, wherein the executable program implements, when executed by a processor, following steps:

determining, in response to the foldable screen being in a non-folded state, a reference plane, wherein the reference plane is perpendicular or parallel to a horizontal plane, a third angle is between the reference plane and a sub-display where the magnetic sensor is located, and when the magnetic sensor is on the reference plane, and the reference plane is parallel to the horizontal plane, the magnetic sensor is not tilted, and when the magnetic sensor is on the reference plane, and the reference plane is perpendicular to the horizontal plane, the magnetic sensor is tilted by 90 degrees;

converting the first motion data in a first coordinate system to second motion data in a second coordinate system differing by the third angle from the first coordinate system, wherein the first motion data is detected by the motion detection components of the electronic device;

converting the first directional data in the first coordinate system to second directional data in the second coordinate system differing by the third angle from the first coordinate system, wherein the first directional data is detected by the magnetic sensor; and indicating a motion direction of the electronic device by using the second motion data and the second directional data.

* * * * *